United States Patent [19]
Humpert et al.

[11] Patent Number: 5,421,364
[45] Date of Patent: Jun. 6, 1995

[54] FLOW-CONTROL VALVE WITH HANDLE-TRAVEL LIMITED

[75] Inventors: Jürgen Humpert, Hemer; Bruno Heimann, Fröndenberg; Christian Frankholz, Schwerte; Detlef Hochstein, Hemer, all of Germany

[73] Assignee: Friedrich Grohe Aktiengesellschaft, Hemer, Germany

[21] Appl. No.: 207,929

[22] Filed: Mar. 7, 1994

[30] Foreign Application Priority Data

Mar. 19, 1993 [DE] Germany ............ 43 08 762.0

[51] Int. Cl.⁶ .................. F16K 37/00; F16K 51/00; F16K 35/02
[52] U.S. Cl. .................. 137/556; 251/288; 251/297
[58] Field of Search .......... 251/286, 288, 297; 137/556

[56] References Cited

U.S. PATENT DOCUMENTS

| | | | |
|---|---|---|---|
| 1,633,074 | 6/1927 | De Mott | 251/288 X |
| 2,784,934 | 3/1957 | Paulius, Jr. et al. | 251/297 X |
| 3,625,479 | 12/1971 | Hammon | 251/288 |
| 4,089,347 | 5/1978 | Christo | 251/288 X |
| 4,348,006 | 9/1982 | Schmitt et al. | 251/297 X |
| 4,643,215 | 2/1987 | Philpot et al. | 251/297 X |
| 4,742,848 | 5/1988 | Black | 251/297 X |

FOREIGN PATENT DOCUMENTS

| | | |
|---|---|---|
| 0000878 | 3/1979 | European Pat. Off. |
| 3127738A1 | 2/1983 | Germany |
| 3402103 | 3/1985 | Germany |
| 9300841 | 4/1993 | Germany |

*Primary Examiner*—John Rivell
*Attorney, Agent, or Firm*—Herbert Dubno; Andrew Wilford

[57] ABSTRACT

A flow-control valve has a valve housing and a valve element in the housing rotatable about an axis through at most 360° between a fully open position for substantially unimpeded fluid flow through the housing and a fully closed position for substantially no fluid flow through the housing and through intermediate positions for intermediate levels of flow through the housing. A spindle coupled to the element extends along and is jointly pivotal with the element about the axis. A handle fixed on the spindle is provided offset from the axis with a handle stop so that the handle stop orbits about the axis as the handle and spindle are rotated to adjust the valve. An abutment body or sleeve fixed on the housing adjacent the knob carries a housing stop that is radially deflectable on the abutment body between a normal position angularly engageable with the handle stop for limiting angular movement of the handle and spindle and a deflected position out of angular engagement with the handle stop and permitting unimpeded angular movement of the handle.

12 Claims, 4 Drawing Sheets

FLOW-CONTROL VALVE WITH HANDLE-TRAVEL LIMITED

FIELD OF THE INVENTION

The present invention relates to a flow-control valve. More particularly this invention concerns a system for limiting the stroke of such a valve.

BACKGROUND OF THE INVENTION

A standard flow control valve such as described in German patent 3,127,738 of M. Pawelzik or in commonly owned U.S. patent application Ser. No. 08/046,005 filed 9 Apr. 1993 by F. Wagner et al has a housing having a chamber into which opens a port, a ceramic valve plate fixed in the chamber over the port, formed with a throughgoing aperture aligned with the port, and having a substantially planar face, and a ceramic control plate having a substantially planar face lying flatly on the valve-plate face and formed with a throughgoing aperture. The control plate can be pivoted relative to the valve plate about an axis substantially perpendicular to and traversing the surfaces between an open position with the control-plate aperture overlapping the valve-plate aperture and a closed position with the control-plate aperture aligned axially with a portion of the valve-plate face and offset angularly from the valve-plate aperture and with the valve-plate aperture aligned axially with a portion of the control-plate face and offset angularly from the control-plate aperture.

The maximum angular stroke or travel of such a valve is normally 180° between the fully open and the fully closed positions. Due to this relatively short stroke, it is common for the user to simply flip the valve to the fully open position, even though that is rarely needed. Clearly this can waste the fluid being dispensed, normally water.

OBJECTS OF THE INVENTION

It is therefore an object of the present invention to provide an improved flow-control valve.

Another object is the provision of such an improved flow-control valve which overcomes the above-given disadvantages, that is which can be set to limit flow, but whose setting can be overridden if desired.

SUMMARY OF THE INVENTION

A flow-control valve has according to the invention a valve housing and a valve element in the housing rotatable about an axis through at most 360° between a fully open position for substantially unimpeded fluid flow through the housing and a fully closed position for substantially no fluid flow through the housing and through intermediate positions for intermediate levels of flow through the housing. A spindle coupled to the element extends along and is jointly pivotal with the element about the axis. A handle fixed on the spindle is provided offset from the axis with a handle stop so that the handle stop orbits about the axis as the handle and spindle are rotated to adjust the valve. An abutment body or sleeve fixed on the housing adjacent the knob carries a housing stop that is radially deflectable on the abutment body between a normal position angularly engageable with the handle stop for limiting angular movement of the handle and spindle and a deflected position out of angular engagement with the handle stop and permitting unimpeded angular movement of the handle.

Thus with this system the stop normally limits the angular stroke or travel of the valve spindle. This housing stop can, however, be depressed to let the handle stop pass, allowing the full range of adjustment to the handle.

In accordance with the invention the body and handle have axially interfitting, axially confronting, annular, and axially centered edges. The handle is limitedly axially displaceable on the spindle. A spring braced between the spindle and the handle urges the handle toward the body and urges the interfitting edges into engagement with each other. Thus the handle is always a tight fit on the abutment sleeve. Furthermore the sleeve has an inner surface and is formed with a radially throughgoing hole in which the housing stop is radially displaceable. The housing stop itself has a surface engageable with the inner surface of the sleeve in the normal position. A spring bearing on the housing stop urges it radially outward into the normal position.

The valve housing according to the invention is provided with a tubular stem surrounding the spindle. The abutment body is a sleeve fitted over the stem. The abutment sleeve and valve housing are formed offset from the axis with axially interfitting formations angularly fixing the sleeve on the housing. A nut threaded on the stem presses the abutment sleeve axially against the housing. This nut has an outer surface against which the housing stop bears in the deflected position. Indicia on the handle and abutment body provide an indication of the relative angular positions of the handle and abutment body.

The spindle of the inventive valve has an axially grooved outer end and the handle has a complementarily axially grooved socket fittable in any of a plurality of angularly offset positions on the spindle outer end. This allows the stop position to be set simply be removing and repositioning the handle.

The stops according to the invention have front faces that are angularly engageable with each other on forward rotation of the handle and opposite back faces engageable with each other on rearward rotation of the handle. One of the back faces is angled such that, when angularly engaged by the other back face on rearward rotation of the handles, the housing stop is cammed into the deflecting position. This planar back face extends at an acute angle to a plane tangent to and intersecting the back face.

Similarly according to the invention the stops have generally radially extending faces that are angularly engageable with each other and at least one of the faces is angled such that on forcible engagement of the faces with each other the other face cams the stop inward into the deflected position. This planar angled face extends at a small acute angle (e.g. 25°) to a plane including the rotation axis and passing through the angled face.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
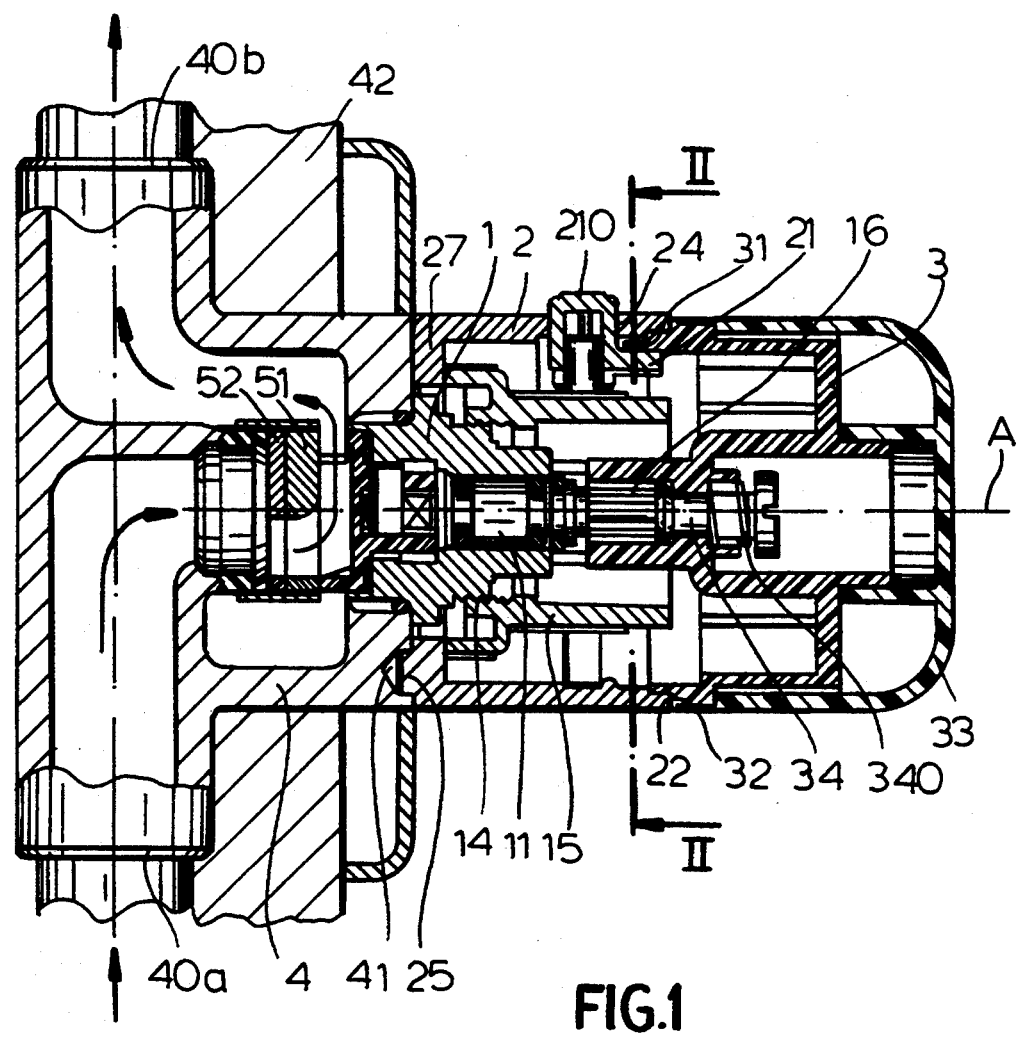
FIG. 1 is an axial section through a valve according to the invention.
Figure 10:
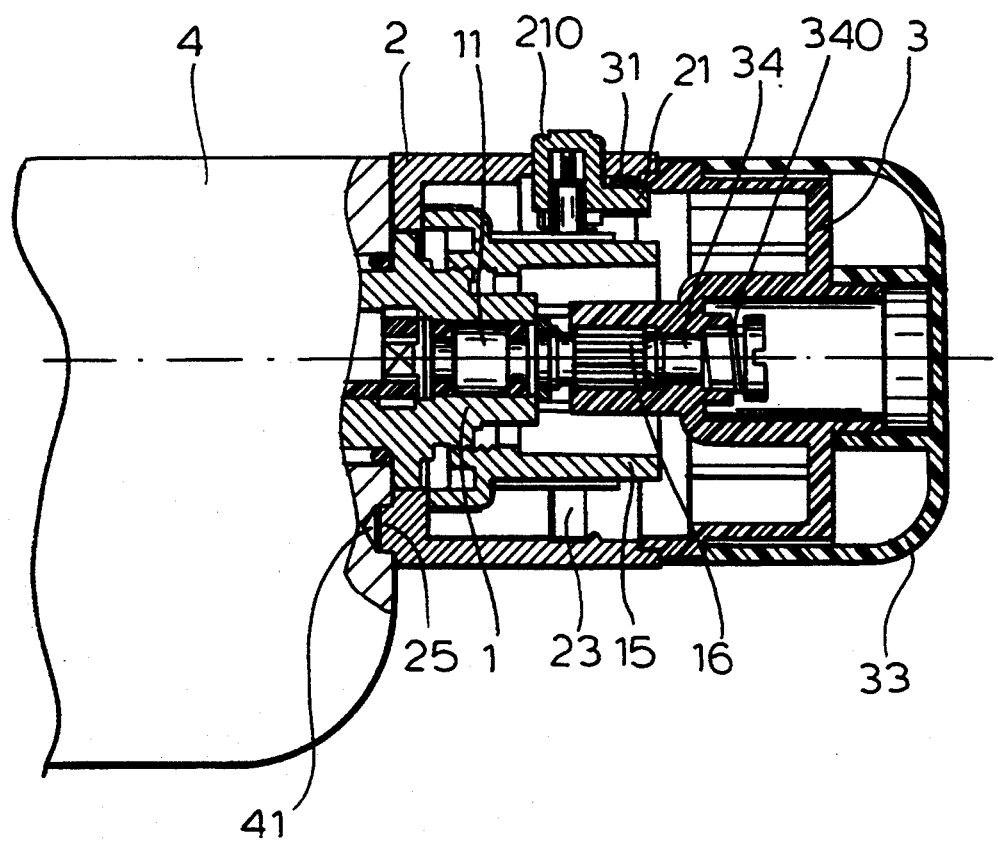
FIG. 10 is a view like FIG. 1 of a recess-mount fixture according to the invention.

As seen in FIGS. 1 and 10, where the sole difference is that in FIG. 1 the valve is mounted recessed and in FIG. 10 it is a surface-mount valve, a valve according to this invention has a housing 4 from which a tubular valve stem 1 extends along an axis A. A spindle 11 rotatable about this axis A in the stem 1 is connected inside the valve to a valve disk 51 that rides on a valve disk 52 to control flow through the housing from an inlet pipe 40a to an outlet pipe 40b as described in the above-cited patent documents.

An abutment sleeve 2 as shown in FIGS. 4 through 7 has an inwardly turned rim 27 forming a circular hole 26 that is fitted coaxially over the stem 1 to seat flatly on the valve housing 4. A sleeve-like nut 15 is engaged on screwthreads 14 of the stem 1 to press the rim 27 axially tightly back against the housing 4. Three angularly spaced bumps 25 formed on the rear face of the rim 27 engage in complementary forwardly open holes or seats 41 on the front face of the housing 1 to rotationally couple the sleeve 2 to the housing 4.

Figure 2:
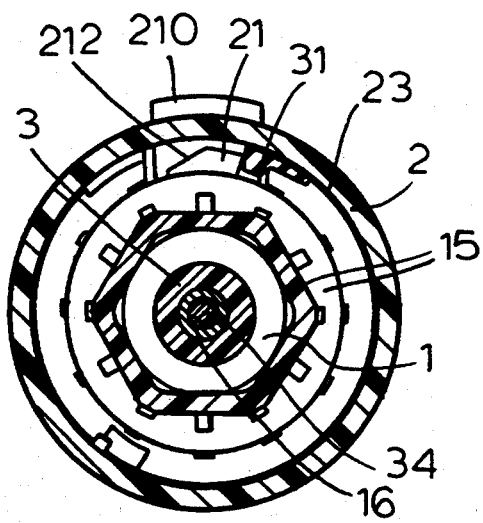
FIG. 2 is a section taken along line II—II of FIG. 1.
Figure 3:
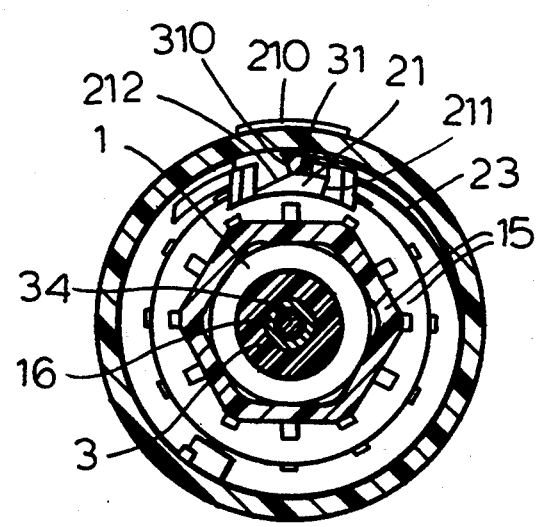
FIG. 3 is a section like FIG. 2 but with the parts in a different position.
Figure 4:
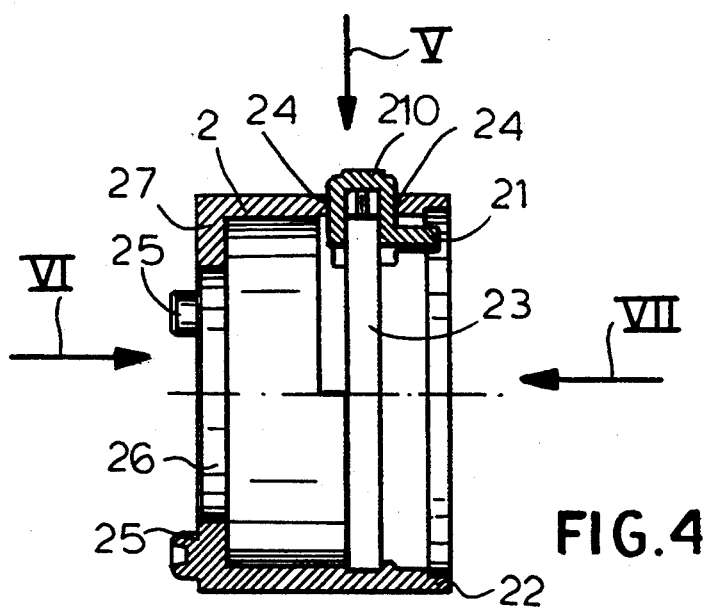
FIG. 4 is an axial section through the abutment sleeve of this invention.
Figure 5:
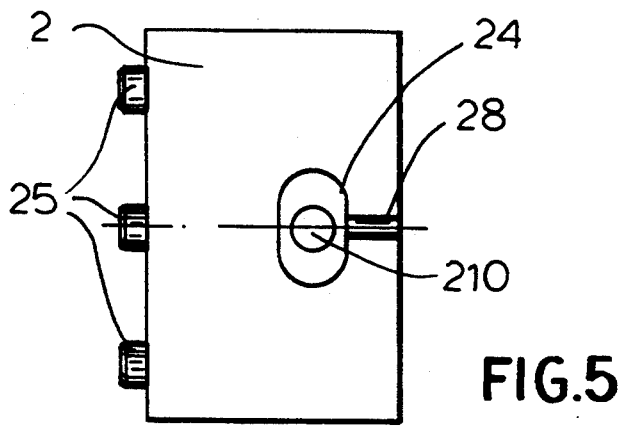
FIGS. 5, 6, and 7 are views taken in the directions of respective arrows V, VI, and VII of FIG. 4.
Figure 6:
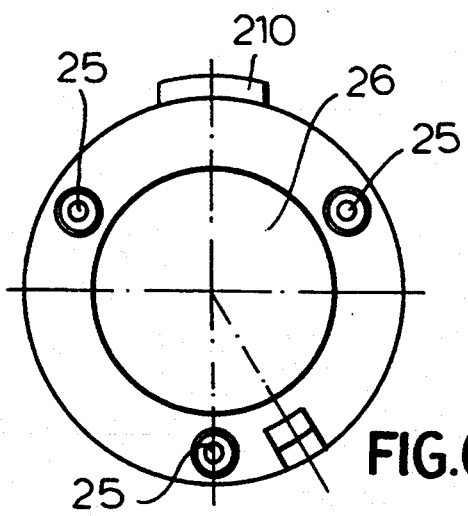
Figure 7:
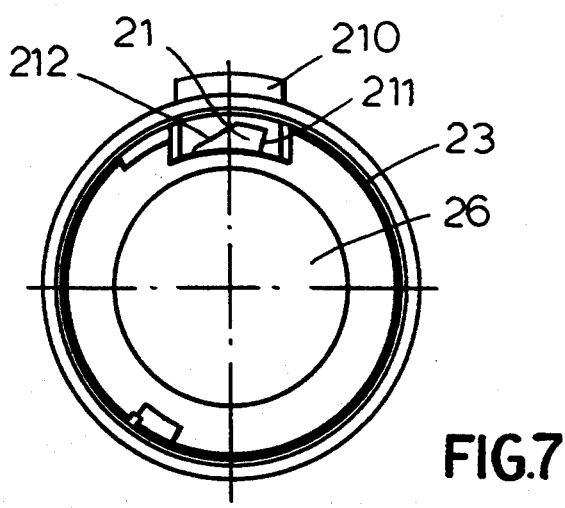

The sleeve 2 is formed as also seen in FIGS. 2 and 3 with a radially throughgoing hole 24 in which is fitted a radially deflectable stop 21 having a button 210 projecting radially out through the hole 24. A leaf spring 23 in the sleeve 2 urges the stop 21 radially outward to normally bear on a cylindrical inner surface of this sleeve 2 while inward travel of the stop 21 is limited by the cylindrical outer surface of the sleeve/nut 15. This stop 21 has a front face 211 extending along a radial plane from the axis A and an outer back face 212 that forms a small acute angle to a plane that is tangential to the axis A and that passes through this surface 212.

Figure 8:
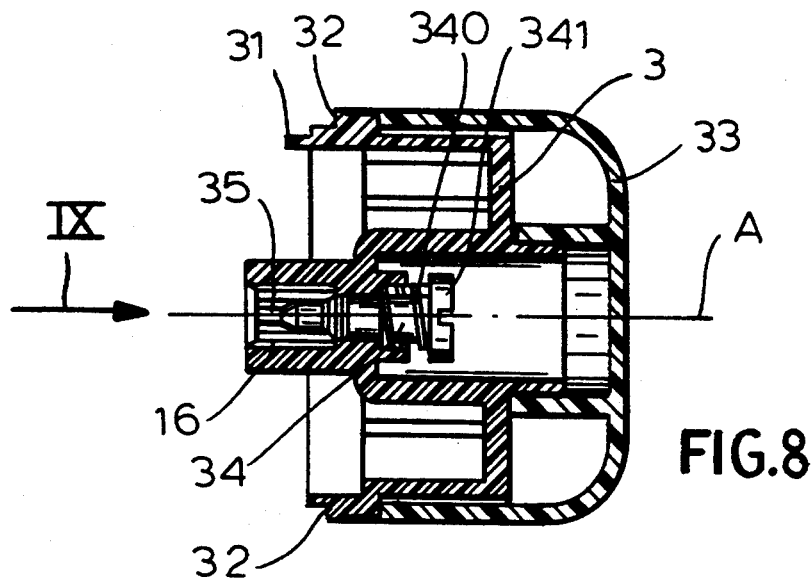
FIG. 8 is an axial section through the handle of this invention.
Figure 9:
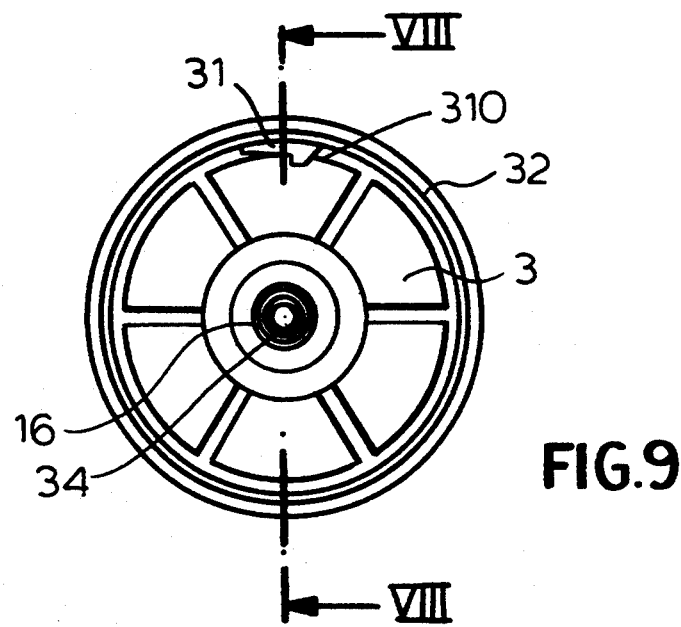
FIG. 9 is a view taken in the direction of arrow IX of FIG. 8, line VIII—VIII of FIG. 9 being the section plane for FIG. 8.

A handle 3 also shown in FIGS. 8 and 9 is a stepped body centered on the axis A and having at its rear end a splined socket 35 complementary to a splined outer end 16 of the stem 11. The splining of the end 16 and socket 35 are angularly uniform so that the handle 3 can be fitted in any of a multiplicity of angularly offset positions on the stem 11. A screw 34 is engaged through the handle 3 and into the end of the stem 11 but has a head 341 axially spaced forward from a confronting surface of the handle 3. A spring 340 braced axially between the head 341 and the handle 3 urges the handle 3 axially backward thereon. A cover cap 33 fitted over the front end of the handle or knob 3 conceals the screw 34 and makes the handle 3 decorative. A pointer 28 on the sleeve 2 cooperates with other unillustrated indicia on the knob 3 to give an accurate reading of the relative angular positions of these parts.

The rear end or edge of the handle 3 is formed with an annular step formation 32 that is complementary to an annular step 22 at the front edge of the abutment sleeve 2. These formations 22 and 32 fit complementarily together, with some axial overlap, so that the joint between the rotatable handle 3 and stationary sleeve 2 is very tight and neat. The spring 340 keeps this joint closed.

A stop tooth 31 formed integrally with the handle 3 extends unitarily back from the inner periphery of the rear edge of the handle 3 and has a front face 310 that extends at an acute angle to a radial plane from the axis A. This face 310 is engageable with the perpendicular face 211 of the stop 21. Normally when the face 310 engages the face 211, the knob 3 is arrested with respect to the fixed abutment sleeve 2. If, however, considerable torque is applied to the handle 3, the angled face 310 cams in the stop 21 against the force of the spring 23 and the stop 31 can move angularly past the stop 21. On reverse rotation of the handle 3 after the stop 31 has passed the stop 21, the stop 31 engages the more acutely angled rear face 212 of the stop 21 and cams it easily inward again, allowing the stop 31 to pass the stop 21. These angled faces 310 and 212 prevent the stops 21 and 31 from getting completely blocked against each other so that if the user forces the knob 3 he or she does not break either of the stops 21 or 31.

We claim:

1. A flow-control valve comprising:
   a valve housing;
   means in the valve housing including a valve element rotatable about an axis through at most 360° between a fully open position for substantially unimpeded fluid flow through the housing and a fully closed position for substantially no fluid flow through the housing and through intermediate positions for intermediate levels of flow through the housing;
   a spindle coupled to the element, extending along, and jointly pivotal with the element about the axis;
   a handle fixed on the spindle and provided offset from the axis with a handle stop, whereby the handle stop orbits about the axis as the handle and spindle are rotated to adjust the valve;
   an abutment body fixed on the housing adjacent the knob;
   formations angularly fixing the body on the housing; and
   a housing stop angularly fixed on the abutment body but radially deflectable on the abutment body between a normal position angularly engageable with the handle stop for limiting angular movement of the handle and spindle, and a deflected position out of angular engagement with the handle stop and permitting unimpeded angular movement of the handle.

2. The flow-control valve defined in claim 1, further comprising
   indicia on the handle and abutment body providing an indication of the relative angular positions of the handle and abutment body.

3. The flow-control valve defined in claim 1 wherein the spindle has an axially grooved outer end and the handle has a complementarily axially grooved socket fittable in any of a plurality of angularly offset positions on the spindle outer end.

4. The flow-control valve defined in claim 1 wherein the stops have front faces that are angularly engageable with each other on forward rotation of the handle and opposite back faces engageable with each other on rearward rotation of the handle, one of the back faces being angled such that, when angularly engaged by the other back face on rearward rotation of the handle, the housing stop is cammed into the deflecting position.

5. The flow-control valve defined in claim 1 wherein the stops have generally radially extending faces that are angularly engageable with each other, at least one of the faces being angled such that on forcible engagement of the faces with each other the other face cams the stop inward into the deflected position.

6. The flow-control valve defined in claim 1 wherein the handle stop is unitarily formed with the handle.

7. A flow-control valve comprising:
a valve housing;
means in the valve housing including a valve element rotatable about an axis through at most 360° between a fully open position for substantially unimpeded fluid flow through the housing and a fully closed position for substantially no fluid flow through the housing and through intermediate positions for intermediate levels of flow through the housing;
a spindle coupled to the element, extending along, and jointly pivotal with the element about the axis;
a handle fixed on the spindle and provided offset from the axis with a handle stop, whereby the handle stop orbits about the axis as the handle and spindle are rotated to adjust the valve;
an abutment body fixed on the housing adjacent the knob, the body and handle having axially interfitting, axially confronting, annular, and axially centered edges, the handle being limitedly axially displaceable on the spindle;
a spring braced between the spindle and the handle urging the handle toward the body and urging the interfitting edges into engagement with each other; and
a housing stop angularly fixed on the abutment body but radially deflectable on the abutment body between a normal position angularly engageable with the handle stop for limiting angular movement of the handle and spindle, and a deflected position out of angular engagement with the handle stop and permitting unimpeded angular movement of the handle.

8. A flow-control valve comprising:
a valve housing;
means in the valve housing including a valve element rotatable about an axis through at most 360° between a fully open position for substantially unimpeded fluid flow through the housing and a fully closed position for substantially no fluid flow through the housing and through intermediate positions for intermediate levels of flow through the housing;
a spindle coupled to the element, extending along, and jointly pivotal with the element about the axis;
a handle fixed on the spindle and provided offset from the axis with a handle stop, whereby the handle stop orbits about the axis as the handle and spindle are rotated to adjust the valve;
an abutment body fixed on the housing adjacent the knob;
a housing stop angularly fixed on the abutment body but radially deflectable on the abutment body between a normal position angularly engageable with the handle stop for limiting angular movement of the handle and spindle, and a deflected position out of angular engagement with the handle stop and permitting unimpeded angular movement of the handle, the body being a sleeve having an inner surface and formed with a radially throughgoing hole in which the housing stop is radially displaceable, the housing stop having a surface engageable with the inner surface of the sleeve in the normal position; and
a spring bearing on the housing stop and urging it radially outward into the normal position.

9. A flow-control valve comprising:
a valve housing;
means in the valve housing including a valve element rotatable about an axis through at most 360° between a fully open position for substantially unimpeded fluid flow through the housing and a fully closed position for substantially no fluid flow through the housing and through intermediate positions for intermediate levels of flow through the housing;
a spindle coupled to the element, extending along, and jointly pivotal with the element about the axis;
a handle fixed on the spindle and provided offset from the axis with a handle stop, whereby the handle stop orbits about the axis as the handle and spindle are rotated to adjust the valve;
an abutment body fixed on the housing adjacent the knob, the valve housing being provided with a tubular stem surrounding the spindle, the abutment body being a sleeve fitted over the stem; and
a housing stop angularly fixed on the abutment body but radially deflectable on the abutment body between a normal position angularly engageable with the handle stop for limiting angular movement of the handle and spindle, and a deflected position out of angular engagement with the handle stop and permitting unimpeded angular movement of the handle.

10. The flow-control valve defined in claim 9 wherein the abutment sleeve and valve housing are formed offset from the axis with axially interfitting formations angularly fixing the sleeve on the housing.

11. The flow-control valve defined in claim 9 wherein the stem is threaded, the valve further comprising
a nut threaded on the stem and pressing the abutment sleeve axially against the housing.

12. The flow-control valve defined in claim 11 wherein the nut has an outer surface against which the housing stop bears in the deflected position.

* * * * *